March 30, 1948.  J. F. SCHOEPPEL  2,438,621
ELECTRIC MOTOR STRUCTURE FOR GYROSCOPES
Filed March 27, 1944
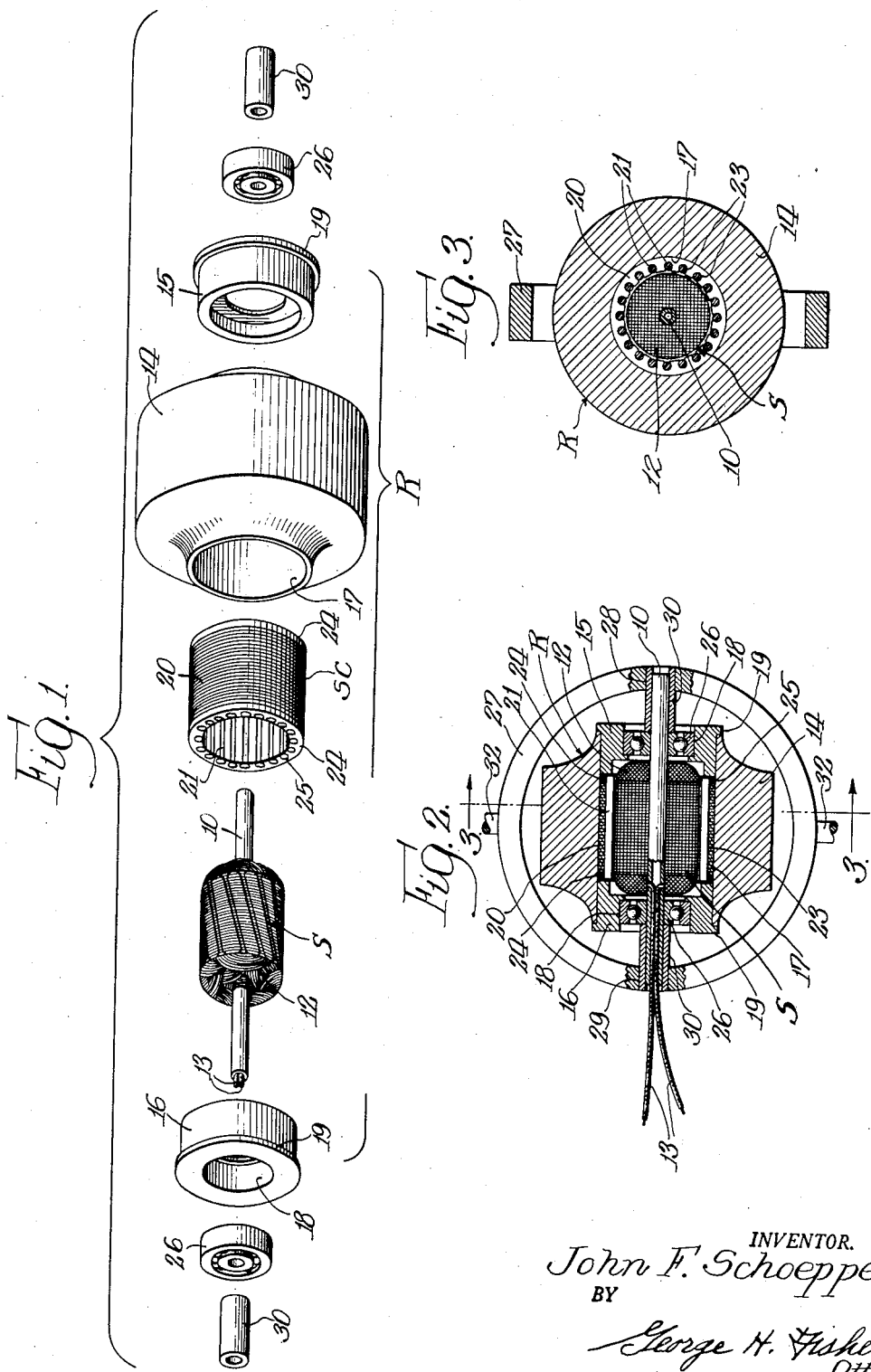
INVENTOR.
John F. Schoeppel,
BY
George H. Fisher
Atty Patented Mar. 30, 1948

2,438,621

UNITED STATES PATENT OFFICE 2,438,621

ELECTRIC MOTOR STRUCTURE FOR GYROSCOPES

John F. Schoeppel, Minneapolis, Minn., assignor to Minneapolis-Honeywell Regulator Company, Minneapolis, Minn., a corporation of Delaware Application March 27, 1944, Serial No. 528,191

5 Claims. (Cl. 172—36)

My invention relates to a gyroscope structure which minimizes and, in many cases, eliminates an out-of-dynamic balance condition of the gyroscope rotor after the same is fabricated.

One object of the invention is to provide an electrically driven rotor for a gyroscope in which useless weight is reduced to a minimum, and the need for dynamic balancing after fabrication of the rotor is either eliminated or reduced to a minimum, the structure thereby being particularly adaptable for mass production for use in automatic pilots, other control devices of airplanes, and the like.

Another object is to provide a gyro-rotor which can operate at extremely high speeds, for instance, 20,000 to 50,000 R. P. M., thereby producing sufficient angular momentum for practical applications with a small rotor, angular momentum equal to a rotor many times its weight but rotating slowly being secured. Such added weight of a large rotor rotating slowly is obviously unnecessary if a small rotor can be inexpensively manufactured in almost perfect dynamic balance so that it is feasible to rotate it at such high speeds.

It is, therefore, another object of my invention to provide a rotor that has a squirrel cage as a minor part of its flywheel mass and has bearing housings as part of said mass, the squirrel cage and bearing housings being press-fitted into a massive shell forming the major portion of the flywheel mass, and the bearing housings and shell being capable of accurate balancing by the machining processes used for forming them.

The squirrel cage and its bearings therefore, by design, furnish only a small proportion of the moment of inertia of the gyro so that unbalance in their manufacture contribute little to total unbalance of the rotor while the massive shell and the bearing housings represent the greater part of the moment of inertia, both by reason of being greater in weight and farther from the axis of rotation than are the squirrel cage and bearings, and are capable of highest precision in the machining thereof by ordinary mass production methods.

A further object is to provide the shell, bearing housings and squirrel cage press-fitted together, after being machined to accurate dimensions so that all parts are concentric with the bores of the bearing housings, and when the bearings for the rotor, such as ball bearings, are inserted in the housings, assurance is had that the rotor will be either in dynamic balance or so close thereto that the need for further adjustment to secure perfect dynamic balance is eliminated or minimized.

Still a further object is to provide a gyroscope rotor that has "dynamic symmetry," such condition being attained by the elimination of holes for screws or other purposes, drilled or otherwise provided at points spaced from the axis of rotation and likewise eliminating screws for such holes. Elements of this character produce a rotor in which there is greater need for balancing, lack of balance being experienced even when the holes and/or screws are accurately and equally spaced on exactly opposite sides of the axis of rotation, and constitute one of the prime causes of dynamic unbalance. By eliminating all such conditions I remove the basic need for dynamic balancing as I remove the theoretical cause thereof as well as provide for easier fabrication by machining of the major portion of the rotor weight, and accurately assemble the parts thereof together by press fits.

An additional object is to minimize the possibility of dynamic unbalance by making the bearings and the conducting bars of the squirrel cage small and closely spaced relative to the axis of rotation, the bars being made of highly conductive material so that they can be of less size and therefore weight, and with their centers of gravity closer to the center of rotation than when they are made of the usual material, to-wit, copper.

With these and other objects in view, my invention consists in the construction, arrangement and combination of the various parts of my gyroscope structure, whereby the objects contemplated are attained, as hereinafter more fully set forth, pointed out in my claims and illustrated in the accompanying drawings, wherein:

Figure 1 is an exploded perspective view of a gyroscope structure embodying my invention.

Figure 2 is a sectional view through the structure showing it mounted in a gimbal ring.

Figure 3 is a sectional view on the line 3—3 of Figure 2.

On the accompanying drawing, I have used the reference numeral 10 to indicate a shaft. The shaft 10 has a stator S mounted thereon which may be wound with coils 12 in the usual manner of the stator of a polyphase induction motor. For supplying current to the coils 12 of the stator S, lead wires 13 extend into the shaft as shown in Figure 2, and connect with the coils 12. The shaft is made tubular, at least at one end, to accommodate the wires.

Around the stator S I provide a rotor designated generally at R which consists of a massive cylindrical shell 14, a squirrel cage SC, and bearing housings 15 and 16. The shell 14 is machined from suitable metal of uniform density throughout as, for instance, by turning it on a lathe, accurately machining the bore 17 of the shell with relation to its outer surface and the end configurations thereof so that all of these surfaces are concentric with each other. The shell, when finished, will be dynamically symmetrical and in perfect dynamic balance providing there is no lack of homogeneity of the metal from which the shell is made.

The bearing housings 15 and 16 are likewise accurately machined so that their bores 18 and their outer surfaces are concentric, the housings, of course, likewise being made of metal having uniform density throughout to secure dynamic symmetry and balance. The outer surfaces of the bearing housings are machined for a press fit in the bore 17 of the shell 14, for accurate location of one relative to the other so that the shell will be concentric with the bores 18 and the parts can be held assembled without the necessity of screws or the like. The housings 15 and 16 are also machined with stop flanges 19 to aid in the proper fitting of the parts together and in alignment of the parts.

The squirrel cage SC is formed of laminae 20 stacked together and provided with rod-like conductor bars 21 preferably of silver or similar metal of high conductivity. The bars extend through notches 23 formed in the laminae. At the ends of the stack of laminae 20, short circuiting rings 24 are mounted and the ends of the bars 21 are press-fitted into similar notches 25 thereof. The squirrel cage is thus held assembled by the rings 24 gripping the bars 21, and the laminae 20 are held compressed against each other by the bars and the rings. The notches 23 are slightly larger than the bars 21 so that the bars and/or the notches may be coated with insulating material to prevent short circuits between the bars and the laminae. The bars 21 are shown as twenty in number on the drawing, whereas experiments show that an odd number of bars gives slightly superior operation and present data indicates that twenty-one seems to be a preferable number.

During assembling of the squirrel cage, the laminae are preferably held accurately in position relative to the rings 24 by a cylindrical jig snugly receiving them. Accordingly, when the rings 24 are press-fitted onto the bars 21, the resultant structure approaches dynamic balance due to the laminae and rings being concentric relative to each other. Of course the notches 25 in the rings 24 must be exactly the same distance from the center of rotation if dynamic balance is to be had.

As an alternative method, the bars 21 and the rings 24 may be cast integrally of silver or other suitable conducting material through the notches 23 and around the margins of the stack of laminae at its ends. Care in making the mold in which they are cast contributes to securing good balance.

I provide a rotating element which, except for the squirrel cage, in theory has exact dynamic balance. If the metal of the massive rotor 14 and of the bearing housings 15 and 16 is homogeneous throughout, and if these parts are machined accurately, this much of the rotor would be in balance both statically and dynamically since they are put together by pressing and without the use of screws and the like. Theoretically it is impossible to make the squirrel cage SC so that it is exactly dynamically balanced. A close approach to this condition is reached however by utilizing a large number of the conducting bars 21.

The drawing shows the parts full size with the squirrel cage having an outside diameter of about 1", and an inside diameter of about ¾". and the number of conducting bars illustrated is a much larger number than would be ordinarily used in an induction motor, the number being considerably more than is ordinarily used in commercial gyro structures at the present time. Further the effect of any unbalance in the squirrel cage is reduced by making its mass a very small proportion of the total mass of the rotor. I accomplish this by using bars 21 having high conductivity so that they can be small in diameter. Copper bars as ordinarily used would have to have twice the diameter or at least be considerably larger than silver in order to carry the same amount of current. By using highly conductive bars I can make them smaller in diameter so that the squirrel cage ring has a thickness of only about ⅛" in a gyroscope of the size mentioned. Of course these dimensions can be varied considerably, but this will give an idea of relative proportions. The result is a total reduction in the mass of the rotor.

Also, by using a large number of conducting bars of small diameter I can place them closely together and still have the necessary iron in the laminae 20 between them so that a closer approach to a continuous ring of silver is had than if there were a smaller number of larger diameter conducting bars. Using the large number of bars more closely spaced and smaller in diameter permits of a closer approach to theoretical dynamic balance.

In assembling the gyroscope, the squirrel cage SC is pressed into the bore 17 of the shell to about a central position therein. The stator S may then be inserted in the squirrel cage and the bearing housings 15 and 16 pressed into position. The flanges 19 serve as stops to limit the inward movement of the bearing housings and aid in properly aligning them with each other. Bearing assemblies 26 may then be placed on the shafts and into the bores 18 of the bearing housings. By way of illustration, these bearing assemblies are ball type with the usual inner and outer races to fit the shaft 10 and the bores 18, respectively. The outer races are dynamically symmetrical and form part of the flywheel mass. Both the shaft and the bearings are small to minimize unbalance resulting from the dynamic unsymmetry of the balls themselves when arranged in an annular row.

The rotor assembly is then assembled relative to a gimbal ring 27 by inserting one end of the shaft 10 in an opening 28 thereof and the other end of the shaft in a similar opening 29. Finally, sleeves 30 are pressed or threaded if desired into the openings and onto the shaft ends whereby the stator, the shaft and the inner races of the bearings 26 form a stationary unit relative to the gimbal ring. Subsequent energization of the stator windings 12 with alternating current results in rotation of the rotor R. In place of the gimbal ring 27, a casing may be provided to enclose the rotor, such casing carrying the sleeve 30. The gimbal ring 27 may be suitably supported by pivots 32 in the usual manner for operation of the gyroscope for any purposes desired, such as to perform an aircraft control function.

A gyroscope has a tendency to hold its position in space. The resistance it has opposing displacement from its position is known as angular momentum which in turn is a product of speed times the moment of inertia. The moment of inertia in turn is equal to the sum of individual masses into which the total mass may be divided, multiplied by the radius squared, or $\Sigma MR^2$. By making a gyroscope that can revolve at speeds as high as 50,000 R. P. M., I have one much faster than the ordinary type now in general use and for this reason I am able to reduce the mass and make a smaller gyro that has the same angular momentum as a relatively large gyro rotating at a slower speed.

By accurately machining the parts that are dynamically symmetrical and by eliminating the use of all holes, screws, etc., the major portion of the rotor mass may be made in substantially perfect dynamic balance. By then making the squirrel cage of small mass through the use of highly conductive bars so that the whole cage can be made with less iron together with the use of a large number of conducting bars, the squirrel cage is as close to having dynamic balance as is possible. Then, since its mass is only a small percentage of the mass of the rotor as a whole, and since it is relatively closer to the axis of rotation than the mass of the shell 14, whatever dynamic unbalance there is in the squirrel cage has just that much less effect on the rotor as a whole. Dynamic unbalance is also minimized in the squirrel cage by accurate spacing of the conductor bars and accurate holding of the parts during assembly.

From the foregoing specification, it is believed obvious that I have provided a simplified gyroscope structure which has inherent dynamic balance, both theoretically as well as practically.

A gyroscope structure as herein disclosed is designed so that the theoretical requirements of dynamic balance are satisfied in the design rather than by balancing operations after fabrication. Every rotating element has been designed to be theoretically in dynamic balance with the exception of the squirrel cage which by its very nature must possess some dynamic unbalance. Such unbalance, however, has been minimized and the design of the total structure is such as to reduce the moment of inertia of the squirrel cage in proportion to that of the rotor as a whole and thus its effect upon the dynamic balance of the otherwise theoretically perfect system. My gyroscopic structure possesses a maximum of inherent dynamic balance and is accordingly well suited to mass production methods by virtue of its design. The greatest moment of inertia is in the shell 14 and it is suitable for accurate production by grinding. The bearing housings 15 and 16 are likewise capable of production by grinding with a minimum of eccentricity between their inner and outer diameters. The squirrel cage SC, besides being a minimum contribution to the moment of inertia, is designed for mass production by preferably casting the bars 21 and rings 24, with a minimum possibility of unbalance being secured by accurate molds for the casting. These rotating parts may be readily made by present day machine tools. Thus the danger of departure from perfect dynamic balance is minimized so that with my construction, if the rotor R, after assembly, tests out of balance it will be very little so, and the operations necessary to make it balance are thereby reduced to a minimum.

It might also be practical to die cast some of the parts or form them of compressed, sintered metallic powders instead of machining them from solid stock and get substantially the same results. Changes of this character and others as well may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a gyroscope structure, a stationary shaft, a stator mounted thereon and having a bore receiving said shaft, and a rotor comprising a massive cylindrical shell, a squirrel cage in said shell, said squirrel cage comprising a magnetic cylinder, said shell being wholly outside of said cylinder, a relatively large number of relatively small conductor bars extending longitudinally through said cylinder and electrically connected together at their ends, said bars being formed of a metal having relatively high conductivity, an annular bearing housing pressed in each end of said shell and retaining said squirrel cage in position therein, and bearings spanning the distance between said shaft and said bearing housings and located within the ends of said cylindrical shell.

2. A gyroscope structure of the character disclosed comprising a stationary shaft, an armature mounted thereon and also stationary, and a rotor, said rotor comprising a massive shell having a single size bore concentric with all other surfaces of the shell and extending throughout the length of the shell, a rotary conductive member adapted to electromagnetically cooperate with said armature of less length than and snugly fitted into said shell, annular bearing housings also snugly fitted into said shell at opposite ends of said conductive member and within said single size bore, and bearings spanning the distance between said shaft and said bearing housings, said bearing housings retaining said conductive member confined between them and having stop flanges engaging the ends of said shell.

3. A gyroscope structure of the character disclosed comprising a stationary shaft, an armature mounted thereon and also stationary, and a rotor, said rotor comprising a massive shell having a single size bore concentric with all other surfaces of the shell, a rotary conductive member adapted to electromagnetically cooperate with said armature positioned in said shell, annular bearing housing in said shell at opposite ends of said conductive member, said shell and bearing housings being dynamically symmetrical, and bearings in said bearing housings for journalling said shaft relative thereto, said bearings and said conductive member being within the end limits of said shell and said bearings retaining said conductive member in said bore.

4. In a gyroscope structure, a stationary shaft, a stator mounted thereon, and a rotor, said rotor comprising a massive cylindrical shell having a bore therethrough of one diameter throughout its entire length, a rotary conductive member adapted to electomagnetically cooperate with said stator press-fitted into said bore intermediate to the ends of said shell, an annular bearing housing press-fitted into and filling each end of said bore at the end of said conductive member, and bearings spanning the distance between said shaft and said bearing housings.

5. A gyroscope structure comprising a shaft, a stator supported thereby, and a rotor surrounding said stator and said shaft, said rotor comprising a shell of cylindrical form, a rotary conductive member adapted to electromagnetically cooperate with said stator positioned in said shell, annular bearing housings snugly fitted into said shell at opposite ends of said conductive member and retaining said conductive member in position therein, and bearings spanning the distance between said shaft and said bearing housings and located within the ends of said cylindrical shell.

JOHN F. SCHOEPPEL.

REFERENCES CITED

The following references are of record in the file of this patent:

UNITED STATES PATENTS

| Number | Name | Date |
|---|---|---|
| 765,078 | Jigouzo | July 12, 1904 |
| 1,584,253 | Tanner | May 11, 1926 |
| 1,764,714 | Boykow | June 17, 1930 |
| 2,053,425 | Else | Sept. 8, 1936 |
| 2,091,888 | Schmidt | Aug. 31, 1937 |
| 2,163,528 | Lauck | June 20, 1939 |
| 2,193,531 | Esval | Mar. 12, 1940 |
| 2,324,676 | Butterfield | July 20, 1943 |
| 2,372,590 | Ljunggren | Mar. 27, 1945 |